United States Patent [19]

Bausch

[11] Patent Number: 5,222,173
[45] Date of Patent: Jun. 22, 1993

[54] ELECTRO-OPTICAL OVERHEAD WIRE WITH AT LEAST 24 LIGHT WAVE GUIDES

[75] Inventor: Joachim Bausch, Lindlar, Fed. Rep. of Germany

[73] Assignee: Felten & Guilleaume Enrgietechnik Aktiengesellschaft, Cologne, Fed. Rep. of Germany

[21] Appl. No.: 749,700

[22] Filed: Aug. 26, 1991

[30] Foreign Application Priority Data

Sep. 17, 1990 [DE] Fed. Rep. of Germany ....... 9013175

[51] Int. Cl.⁵ .................................................. G02B 6/44
[52] U.S. Cl. .................................... 385/101; 385/102; 385/107; 385/108
[58] Field of Search ....................... 350/96.23, 96.24; 385/100, 102, 106, 107, 108, 101

[56] References Cited

U.S. PATENT DOCUMENTS

| | | | |
|---|---|---|---|
| 4,709,983 | 12/1987 | Plessner et al. | 350/96.23 |
| 4,952,012 | 8/1990 | Stamnitz | 350/96.23 |
| 4,971,420 | 11/1990 | Smith | 350/96.23 |

OTHER PUBLICATIONS

Feltd-Com OPGW-Optical Ground Wire, Pamphlet, Felton & Guilleaume Energietechnik A.G., Mar. 1991.
High-Voltage Overhead Wires with Optical Fibres, *Electrizitatswirt Schaft,* Aug. 1988, p. 462–466. (Tranlation).

Primary Examiner—John D. Lee
Assistant Examiner—S. W. Barns
Attorney, Agent, or Firm—Michael J. Striker

[57] ABSTRACT

The electro-optical overhead wire is made from a plurality of circular cross-sectioned strand elements and consists of a core and a plurality of wire layers surrounding the core radially. The wire layers include at least one layer of chiefly electrically conducting wires and at least one other layer of predominantly high tensile strength wires. At least one of the wire layers of the high tensile strength wire also contains at least two strand elements arranged symmetrically around the core and each consisting of a high quality steel tube with an outer diameter of 2.5 mm containing at least 12 light wave guides. Alternatively or in addition, the electro-optical overhead wire is made up of a core and a first wire layer immediately surrounding the core and a second wire layer immediately surrounding the first wire layer, while the core contains a high quality steel tube with a five mm diameter containing 12, 18 or 24 bundles of light wave guides containing two light wave guides in each bundle.

8 Claims, 1 Drawing Sheet

# 5,222,173

ELECTRO-OPTICAL OVERHEAD WIRE WITH AT LEAST 24 LIGHT WAVE GUIDES

BACKGROUND OF THE INVENTION

The present invention relates to an electro-optical overhead wire and, more particularly, to an electro-optical overhead wire containing at least 24 light wave guides (LWG).

An electro-optical overhead wire is described in Published German Utility Patent 90 01 893 U1. This electro-optical overhead wire is made from circular cross-sectioned cable strand elements. The core is provided with at least one layer of primarily high tensile strength wires and additionally at least one layer of chiefly electrically conducting wires. At least one strand element of the overhead wire is replaced by a high quality steel tube, in which a plurality of light wave guides (LWG) are loosely placed and extend over the length of the cable (LWL tube). These light wave guides in the steel tube are surrounded by a gel.

Now electro-optical cables and overhead wires are known, in which a plurality of small LWG tubes (diameter about 2.5 mm) are no longer positioned in one of the wire layers about the core, but the core itself is formed as a comparatively larger LWG tube (diameter about 5 mm).

In German Published Application Patent DE 34 46 766 A1 (BBC) Electro-optical overhead wire with about 4 light wave guides is described. This overhead wire has the following structure from the furthest interior radially to the exterior: a plastic filling material; 4 LWG (coated optical fibers); a tube made from fibre glass or carbon fibre reinforced plastic (FRP or CRP), diameter about 5 mm; a first layer of steel wires and a second and third layer of aluminum wires. The invention here relates primarily to the LWG tube, which is made from FRP or CRP.

German Published Patent Application 38 04 419 A1 (Siemens) describes an electro-optical overhead wire with greater than 15 light wave guides (LWG). This overhead wire has the following structure from the furthest interior radially to the exterior: LWG-core bundle with about 15 LWG embedded in cross-linked silicon; a tube in the form of three nonmetal sheaths; a first layer of steel wire and two layers of aluminum wire. The invention here relates primarily to the LWG tube in the form of three nonmetal layers.

In European Published Patent Application 0 371 660 A1 (Stamnitz) an electro-optical undersea cable is described with more than 24 LWG. This undersea cable has the following structure from the furthest interior radially to the exterior: Up to 24 LWG loosely embedded in gel; high quality steel tube; about 1.25 mm in diameter with a wall thickness of about 0.125 mm; a layer of electrically conductive material-wire, in which several wires are replaced by a high quality steel pipe with several (about 3) LWG; extruded dielectric and 2 layers of steel wire as reinforcement. The invention relates here to an undersea cable structure which has more than 24 light wave guides.

In addition electro-optical cables and overhead wires are also known in which the light wave guides are disposed around a comparatively large core element, which has a comparatively large diameter of about 5 mm or more and acts as a high tension and supporting element. These references are as follows:

In German Published Patent Application 36 21 158 A1 (Philips) an electro-optical overhead wire having 6 light wave guides is described. In a first cable structure one FRP (fibre glass reinforced plastic) supporting element is surrounded with 6 coated light wave guides. A filling mass of silicon rubber or ethylene propylene rubber is provided. The surrounding tube is made from aluminum profile wires followed by a layer of aluminum alloy (E-AlMgSi) round wires and aluminum clad steel (ACS) round wires. The invention in this reference concerns the filling mass.

In German Published Patent Application 35 35 827 A1 (Fujikura) an electro-optical overhead wire with 36 light wave guides is described. This overhead wire has the following structure: a central element of steel wire with a FRP sheath; around this element 6 LWG cables with 6 LWG each; a soft filling material made from a plastic resin; a rigid filling material in form of a sleeve or tube made from plastic resin; a metal tube (Al, Cu, Fe) and a layer of conductive wire. Herein the LWG cables have the following detail structure: a core of steel or FRP wire; around this 6 LWG each loosely positioned in a sheath; a soft filling material and then a rigid tube. In this reference the invention concerns primarily the nature of the filling material and also the structure of the electro-optical cable.

SUMMARY OF THE INVENTION

It is an object of the present invention to provide an electro-optical overhead wire including a core surrounded by a plurality of wire layers including one wire layer having electrically conducting wires and another wire layer including high tensile strength wires having 24 or more LWG.

These objects and others which will become more apparent hereinafter are attained in an electro-optical overhead wire made from a plurality of circular cross-sectioned strand elements and comprising a core and a plurality of wire layers surrounding the core radially. The wire layers include at least one wire layer made of chiefly electrically conducting wires and at least one other wire layer made of predominantly high tensile strength wires, in which at least one of the strand elements is replaced by a high quality steel tube. The high quality steel tube contains a plurality of light wave guides extending along the cable and embedded in a gel.

In one form of the invention, at least one of the wire layers of high tensile strength wire also contains at least two strand elements arranged symmetrically around the core, which consisting of one of the high quality steel tubes having an outer diameter of 2.5 mm and containing at least 12 of the light wave guides. Advantageously, the core consists of a steel wire with a diameter of about 2.5 mm, the first wire layer immediately surrounding the core consists of aluminum clad steel wires and the second wire layer immediately surrounding the first wire layer consists of aluminum wires. In the first wire layer three of the aluminum clad steel wires are each replaced by one of the high quality steel wires having an outer diameter of about 2.5 mm, which contains 12 light wave guides.

In another form of the invention, the core contains a high quality steel tube having at least 24 light wave guides and having an outer diameter of 5 mm, while the first, second and other surrounding wire layers do not contain light wave guides. Advantageously, the high quality steel tube with the diameter of 5 mm contains one of 12, 18 and 24 light wave guide bundles, and each of said bundles contains two of said light wave guides. Advantageously the wire layers can also contain light wave guides.

The electro-optical cables according to the invention have a substantially increase capacity in comparison to those of the prior art.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENTS

Figure 1:
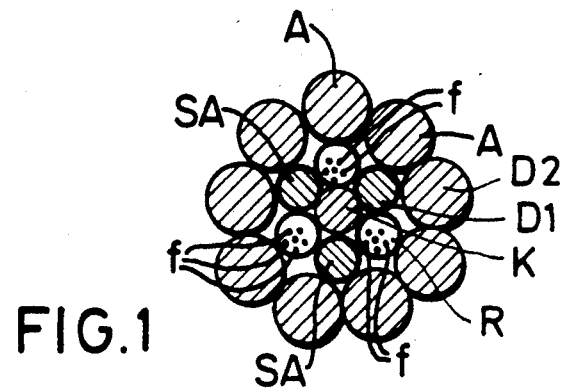
FIG. 1 is a transverse cross-sectional view through an electro-optical overhead wire having a massive core consisting of a steel wire of outer diameter 2.5 mm and three tubes in the first wire layer containing light wave guides.

FIG. 1 shows a first electro-optical overhead wire according to the invention. In the electro-optical overhead wire of FIG. 1 the core K has an outer diameter of about 2.5 mm. Surrounding the core K there is a first wire layer D1 of three aluminum clad steel wires SA and three high quality steel tubes R having an outer diameter of about 2.5 mm, which contain 12 LWG, f. There is also a second wire layer of aluminum wires A. Some of the features are described in German Application 90 01 893.

Figure 2:
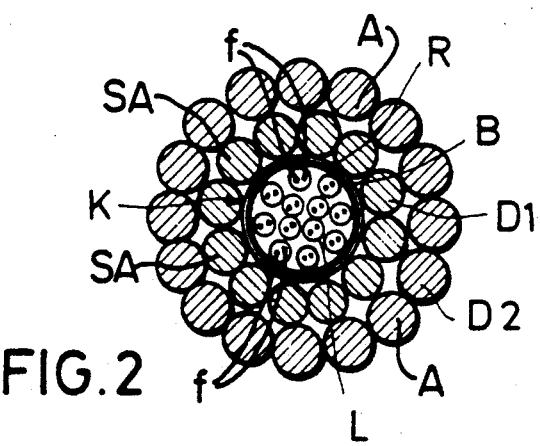
FIG. 2 is a transverse cross-sectional view through an electro-optical overhead wire according to the invention having a tubular core of 5 mm outer diameter containing more than 24 light wave guides.

FIG. 2 shows another form of the invention. Here all of the light wave guides f are located in the core K. The core K consists of a single high quality steel tube R surrounded by a sheath B made of an aromatic polyamide (Kevlar) and has a 5 mm outer diameter. Inside of the high quality steel tube R there are 12, 18 or 24 light wave guide bundles L each containing two light wave guides f. The first wire layer D1 consists of aluminum clad steel wires SA and the second wire layer D2 consists of aluminum wires A.

The LWG tube R is preferably smooth, eventually helically corrugated in form: The wall thickness of the tube R is from 0.2 to 0.5 mm. As is conventional, the tube R is formed longitudinally from an elongated strip and welded or heat sealed and the LWG bundles are inserted with surplus length (for expansion compensation with temperature changes) and are embedded in a gel. A Kevlar sheath is applied for increasing the short circuit temperature (it is wound overlapping itself). Kevlar is a trademark of the DuPont Corp. for an aromatic polyamide.

Figure 3:
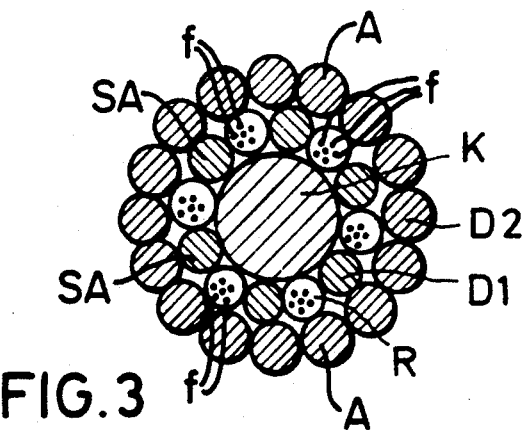
FIG. 3 is a transverse cross-sectional view through an electro-optical overhead wire according to the invention having a comparatively large massive core element of about 5 mm outer diameter and a first wire layer containing 6 high quality steel tubes including light wave guides.

Another electro-optical overhead wire is shown in FIG. 3. The core K is a supporting strand element made from Kevlar and has a diameter of about 5 mm. A first wire layer D1 of steel coated aluminum wires SA and high quality steel tubes R surrounds the core. The high quality steel tubes R contain 12 LWG and have an outer diameter of about 2.5 mm. The second wire layer D2 surrounding the first wire layer D1 is made of aluminum strand elements or wires A.

While the invention has been illustrated and described as embodied in an electro-optical overhead wire containing at least 24 light wave guides, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. In an electro-optical overhead wire made from a plurality of circular cross-sectioned strand elements, said strand elements being such that the overhead wire has required overhead wire properties including a high tensile strength, said overhead wire consisting of a core and a plurality of wire layers radially surrounding the core, at least one of the wire layers comprising a plurality of electrically conducting wires and at least one other of the wire layers comprising a plurality of high tensile strength wires, at least one of the wires of the wire layers being replaced by a high quality steel tube, said high quality steel tube containing a plurality of light wave guides extending along the tube and embedded in a gel, the improvement wherein at least one of the wire layers of the high tensile strength wires also contains at least two of the high quality steel tubes arranged symmetrically around the core, each of the high quality steel tubes containing at least 12 of the light wave guides, said high quality steel tubes containing the at least 12 light wave guides having an outer diameter of 2.5 mm.

2. The improvement as defined in claim 1, wherein the wire layer of the high tensile strength wires having the at least two high quality steel tubes is located immediately adjacent the core without an intervening one of the wire layers.

3. An electro-optical overhead wire consisting of a core consisting of a steel wire with a diameter of about 2.5 mm, a first wire layer immediately surrounding the core consisting of three aluminum clad steel wires and three high quality steel tubes, each of the high quality steel tubes having an outer diameter of about 2.5 mm and containing at least 12 light wave guides, and a second wire layer immediately surrounding the first wire layer consisting of a plurality of aluminum wires.

4. An electro-optical overhead wire consisting of a core comprising a high tensile strength aromatic polyamide member having a diameter of about five millimeters; a first wire layer immediately surrounding the core consisting of six high quality steel tubes, each of the six high quality steel tubes containing 12 light wave guides and a plurality of members selected from the group consisting of aluminum clad steel wires and aluminum wires; and a second wire layer immediately surrounding the first wire layer consisting of a plurality of aluminum wires.

5. In an electro-optical overhead wire made from a plurality of circular cross-sectioned strand elements, said overhead wire consisting of a core and a plurality of wire layers surrounding the core radially, said wire layers including at least one wire layer comprising a plurality of electrically conducting wires and at least one other wire layer comprising a plurality of high tensile strength wires, the improvement wherein the core comprises a high quality steel tube containing at least 24 of the light wave guides, said high quality steel tube having an outer diameter of 5 mm.

6. The improvement as defined in claim 5, wherein the high quality steel tube of the core contains one of 12, 18 and 24 light wave guide bundles, and each of said bundles contains two of said light wave guides, said high quality steel tube of the core being provided with a sheath made from an aromatic polyamide and the wire layers include a first wire layer comprising a plurality of aluminum clad steel wires immediately surrounding the core and a second wire layer surrounding the first wire layer comprising a plurality of aluminum wires.

7. The improvement according to claim 6, wherein at least one of the wire layers also contains at least two of the high quality steel tubes of said wire layer arranged symmetrically around the core.

8. An electro-optical overhead wire made from a plurality of circular cross-sectioned strand elements, said overhead wire consisting of a core made of a high quality steel tube containing at least 24 light wave guides, said steel tube having a diameter of 5 mm and provided with an aromatic polyamide sheath; a first wire layer immediately surrounding the core consisting of a plurality of aluminum clad steel wires; and a second wire layer surrounding the first wire layer consisting of a plurality of aluminum wires.

* * * * *